(12) United States Patent
Burkholz et al.

(10) Patent No.: US 12,446,889 B2
(45) Date of Patent: Oct. 21, 2025

(54) VASCULAR INSTRUMENT DELIVERY DEVICE AND RELATED SYSTEMS AND METHODS

(71) Applicant: Becton, Dickinson and Company, Franklin Lakes, NJ (US)

(72) Inventors: Jonathan Karl Burkholz, Salt Lake City, UT (US); Megan Scherich, Salt Lake City, UT (US)

(73) Assignee: Becton, Dickinson and Company, Franklin Lakes, NJ (US)

( * ) Notice: Subject to any disclaimer, the term of this patent is extended or adjusted under 35 U.S.C. 154(b) by 370 days.

(21) Appl. No.: 17/195,230

(22) Filed: Mar. 8, 2021

(65) Prior Publication Data
US 2021/0290247 A1    Sep. 23, 2021

Related U.S. Application Data

(60) Provisional application No. 62/993,470, filed on Mar. 23, 2020.

(51) Int. Cl.
*A61M 39/10* (2006.01)
*A61B 17/12* (2006.01)
(Continued)

(52) U.S. Cl.
CPC ....... *A61B 17/12145* (2013.01); *A61M 39/10* (2013.01); *A61M 39/24* (2013.01);
(Continued)

(58) Field of Classification Search
CPC .......... A61M 25/0111; A61M 25/0113; A61M 25/0122; A61M 25/09041;
(Continued)

(56) References Cited

U.S. PATENT DOCUMENTS 3,572,375 A  *  3/1971  Rosenberg ............ A61M 39/24
                                                                 604/152
3,703,174 A  *  11/1972  Smith ................ A61M 25/0122
                                                                 226/97.1
(Continued)

FOREIGN PATENT DOCUMENTS

JP       S5620023 B2     5/1981
JP      2015509815 A     4/2015
(Continued)

OTHER PUBLICATIONS

Velano Vascular, Inc., PIVO Needleless Blood Draw Solution, Webpage, <https://velanovascular.com/solutions/> (last accessed May 19, 2021).

*Primary Examiner* — Kevin C Sirmons
*Assistant Examiner* — Leah J Swanson
(74) *Attorney, Agent, or Firm* — The Webb Law Firm (57) ABSTRACT

An instrument delivery device to couple to a vascular access device. The instrument delivery device may include a housing, which may include a distal connector, a proximal connector, and a lumen extending through the distal connector and the proximal connector. The instrument delivery device may include a vascular access instrument, which may include a distal end and a proximal end. The vascular access instrument may be disposed within the lumen of the housing in a coiled position. The vascular access instrument may be configured to move from the coiled position to an uncoiled position and advance through the distal connector. The vascular access instrument may extend through the vascular access device into vasculature of a patient.

4 Claims, 7 Drawing Sheets

(51) Int. Cl.
  *A61M 25/09* (2006.01)
  *A61M 39/24* (2006.01)
  *A61M 25/06* (2006.01)

(52) U.S. Cl.
  CPC .. *A61B 2017/1205* (2013.01); *A61M 25/0693* (2013.01); *A61M 25/09041* (2013.01); *A61M 2039/1077* (2013.01)

(58) Field of Classification Search
  CPC .......... A61M 2025/0063; A61M 39/10; A61M 39/24; A61M 2039/1077
  See application file for complete search history.

(56) References Cited

U.S. PATENT DOCUMENTS

| | | | | |
|---|---|---|---|---|
| 3,835,854 | A * | 9/1974 | Jewett | A61M 25/0113 604/159 |
| 4,525,157 | A * | 6/1985 | Vaillancourt | A61M 25/0111 604/165.01 |
| 6,585,701 | B1 * | 7/2003 | Dysarz | A61M 5/3232 604/164.11 |
| 7,056,306 | B1 * | 6/2006 | Halseth | A61B 5/150244 604/110 |
| 8,444,658 | B2 * | 5/2013 | Kim | A61B 17/0482 606/144 |
| 9,186,100 | B2 * | 11/2015 | Devgon | A61B 5/154 |
| 10,238,838 | B2 | 3/2019 | Datta et al. | |
| 2007/0050006 | A1 | 3/2007 | Lavelle | |
| 2013/0237925 | A1 * | 9/2013 | Trainer | A61M 39/06 604/247 |
| 2015/0224287 | A1 | 8/2015 | Bian et al. | |
| 2015/0290421 | A1 | 10/2015 | Glickman et al. | |
| 2017/0252060 | A1 | 9/2017 | Ellingson et al. | |
| 2018/0021545 | A1 | 1/2018 | Mitchell et al. | |
| 2021/0220605 | A1 | 7/2021 | Burkholz et al. | |
| 2021/0260345 | A1 | 8/2021 | Burkholz et al. | |
| 2021/0290901 | A1 | 9/2021 | Burkholz et al. | |
| 2021/0290926 | A1 | 9/2021 | Scherich et al. | |

FOREIGN PATENT DOCUMENTS

| | | |
|---|---|---|
| JP | 2019511259 A | 4/2019 |
| WO | 9711736 A1 | 4/1997 |
| WO | 9911191 A1 | 3/1999 |
| WO | 2008005618 A2 | 10/2008 |
| WO | 2008147861 A1 | 12/2008 |
| WO | 2017136729 A1 | 8/2017 |
| WO | 2018017641 A2 | 1/2018 |

* cited by examiner

VASCULAR INSTRUMENT DELIVERY DEVICE AND RELATED SYSTEMS AND METHODS

RELATED APPLICATIONS

This application claims the benefit of U.S. Provisional Patent Application No. 62/993,470, filed on Mar. 23, 2020, entitled "VASCULAR INSTRUMENT DELIVERY DEVICE AND RELATED SYSTEMS AND METHODS," which is incorporated herein in its entirety.

BACKGROUND

A catheter is commonly used to infuse fluids into vasculature of a patient. For example, the catheter may be used for infusing normal saline solution, various medicaments, or total parenteral nutrition. The catheter may also be used for withdrawing blood from the patient.

The catheter may include an over-the-needle peripheral intravenous ("IV") catheter. In this case, the catheter may be mounted over an introducer needle having a sharp distal tip. The catheter and the introducer needle may be assembled so that the distal tip of the introducer needle extends beyond the distal tip of the catheter with the bevel of the needle facing up away from skin of the patient. The catheter and introducer needle are generally inserted at a shallow angle through the skin into vasculature of the patient.

In order to verify proper placement of the introducer needle and/or the catheter in the blood vessel, a clinician generally confirms that there is "flashback" of blood in a flashback chamber of the catheter assembly. Once placement of the needle has been confirmed, the clinician may temporarily occlude flow in the vasculature and remove the needle, leaving the catheter in place for future blood withdrawal or fluid infusion.

Blood withdrawal using the catheter may be difficult for several reasons, particularly when a dwell time of the catheter within the vasculature is more than one day. When the catheter is left inserted in the patient for a prolonged period of time, the catheter or vein may be more susceptible to narrowing, collapse, kinking, blockage by debris (e.g., fibrin or platelet clots), and adhering of a tip of the catheter to the vasculature. Due to this, the catheter is often used for acquiring a blood sample at a time of catheter placement, but the catheter is less frequently used for acquiring a blood sample during the catheter dwell period. Therefore, when a blood sample is required, an additional needle stick is often needed to provide vein access for blood collection, which may be painful for the patient and result in higher material costs.

The subject matter claimed herein is not limited to embodiments that solve any disadvantages or that operate only in environments such as those described above. Rather, this background is only provided to illustrate one example technology area where some implementations described herein may be practiced.

SUMMARY

The present disclosure relates generally to an instrument delivery device configured to couple to a vascular access device and deliver a vascular access instrument through the vascular access device. In some embodiments, the instrument delivery device may include a housing, which may include a distal connector, a proximal connector, and a lumen extending through the distal connector and the proximal connector. In some embodiments, the instrument delivery device may include the vascular access instrument, which may include a distal end and a proximal end. In some embodiments, the vascular access instrument may be disposed within the lumen of the housing in a compact position that includes one or more bends in the vascular access instrument. In some embodiments, the compact position may include a coiled position. In some embodiments, the vascular access instrument may be configured to move from the compact position to an extended or outstretched position, which may include an uncoiled position, and advance through the distal connector.

In some embodiments, the instrument delivery device may include another housing, which may be coupled to the distal connector. In some embodiments, the other housing may include another distal connector, another proximal connector, and another lumen extending through the other distal connector and the other proximal connector. In some embodiments, the other housing may include a one-way valve disposed within the other lumen.

In some embodiments, the vascular access instrument may include a wire. In some embodiments, the wire may be coiled. In some embodiments, the vascular access instrument may include a tube. In some embodiments, the distal connector may include a cannula or a male luer connector. In some embodiments, the proximal connector may include a female luer connector.

In some embodiments, the proximal end of the vascular access instrument may include a stop. In some embodiments, an outer diameter of the stop may be greater than a diameter of the lumen to prevent the proximal end of the vascular access instrument from moving through the distal connector. In some embodiments, the stop may be spherical, wedge-shaped, or another suitable shape. In some embodiments, the stop may include a fluid pathway extending through the stop. In some embodiments, the stop may be configured to prevent fluid from flowing through the stop.

In some embodiments, a method may include inserting a catheter assembly into vasculature of a patient. In some embodiments, the catheter assembly may include a catheter adapter, which may include a distal end, a proximal end, and a lumen extending through the distal end and the proximal end. In some embodiments, the catheter assembly may include a catheter extending distally from the distal end of the catheter adapter. In some embodiments, the method may include coupling the instrument delivery device to the catheter assembly. In some embodiments, coupling the instrument delivery device to the catheter assembly may include coupling the other distal connector to the catheter assembly.

In some embodiments, after inserting the catheter assembly into the vasculature of the patient, the method may include advancing the vascular access instrument through the catheter. In some embodiments, advancing the vascular access instrument through the catheter may include coupling a pre-filled syringe to the proximal connector and depressing a plunger of the pre-filled syringe.

In some embodiments, the housing may include a pre-filled syringe, which may include the distal connector. In some embodiments, the vascular access instrument may be disposed within the pre-filled syringe. In some embodiments, in response to depression of a plunger of the pre-filled syringe, the vascular access instrument may be configured to move from the compact position to the outstretched position and advance through the distal connector.

In some embodiments, the vascular access instrument may facilitate blood collection from a patient, fluid delivery to the patient, patient or device monitoring, or other clinical needs by utilizing an existing catheter dwelling within vasculature of the patient. In some embodiments, the vascular access instrument may facilitate one or more of the following: reduce trauma to the vasculature, decrease blood collection time, and overcome thrombus or fibrin sheath in or around the catheter that may prevent blood draw. In some embodiments, the vascular access instrument may be used to extend a life of the catheter dwelling within the vasculature and may reduce a number of needle sticks. In some embodiments, the vascular access instrument may include one or more of a coiled wire, guidewire, a probe, and the tube. In some embodiments, the vascular access instrument may include a sensor.

It is to be understood that both the foregoing general description and the following detailed description are exemplary and explanatory and are not restrictive, as claimed. It should be understood that the various embodiments are not limited to the arrangements and instrumentality shown in the drawings. It should also be understood that the embodiments may be combined, or that other embodiments may be utilized and that structural changes, unless so claimed, may be made without departing from the scope of the various embodiments of the present disclosure. The following detailed description is, therefore, not to be taken in a limiting sense.

BRIEF DESCRIPTION OF THE SEVERAL VIEWS OF THE DRAWINGS

Example embodiments will be described and explained with additional specificity and detail through the use of the accompanying drawings in which.

DESCRIPTION OF EMBODIMENTS

Figure 1A:
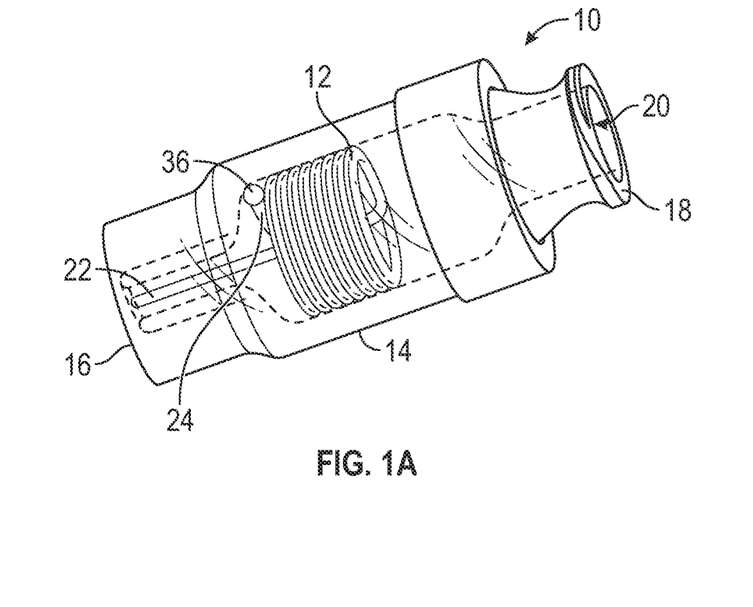
FIG. 1A is an upper perspective view of an example instrument delivery device, illustrating an example housing, according to some embodiments.

Referring now to FIG. 1A, in some embodiments, an instrument delivery device 10 may be configured to couple to a vascular access device and deliver a vascular access instrument 12 into and/or through the vascular access device. In some embodiments, the instrument delivery device 10 may include a housing 14, which may include a distal connector 16, a proximal connector 18, and a lumen 20 extending through the distal connector 16 and the proximal connector 18. In some embodiments, the distal connector 16 may include a cannula, a male luer connector, or another suitable connector. In some embodiments, the proximal connector 18 may include a female luer connector or another suitable connector. In some embodiments, the female luer connector may include a needleless access connector or one or more features of a needleless access connector. For example, the female luer connector may include a septum or valve.

In some embodiments, the instrument delivery device 10 may include the vascular access instrument 12, which may include a distal end 22 and a proximal end 24. In some embodiments, the vascular access instrument 12 may be disposed within the lumen 20 of the housing 14 in a compact position that includes one or more bends in the vascular access instrument 12. As illustrated in FIG. 1A, in some embodiments, the compact position may include a coiled position. In some embodiments, the coiled position may prevent entanglement of the vascular access instrument 12 as it moves from the compact position to an extended or outstretched position.

In some embodiments, a length of the vascular access instrument 12 in the compact position may be less than a length of the vascular access instrument 12 in the outstretched position. In some embodiments, the vascular access instrument 12 may be generally straight in the outstretched position. In some embodiments, the compact position of the vascular access instrument 12 may facilitate storage within the housing 14 of the vascular access instrument 12 of a sufficient length to extend through the vascular access device, while also allowing the housing 14 to be compact. In some embodiments, the distal end 22 of the vascular access instrument 12 may be disposed within the distal connector 16 adjacent a distal opening 25, which may prevent entanglement of the vascular access instrument 12 as it moves from the compact position to the outstretched position.

Figure 1B:
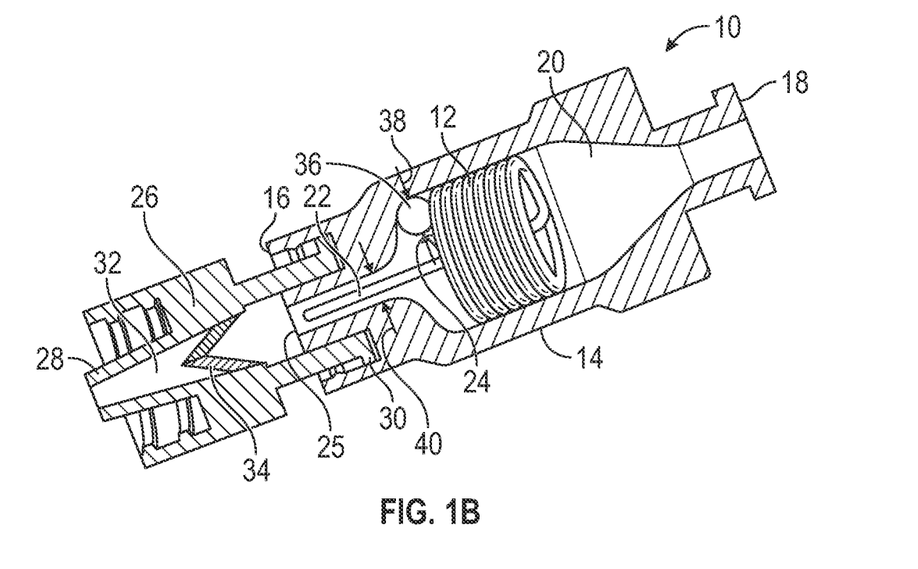
FIG. 1B is a cross-sectional view of the instrument delivery device coupled to another housing, according to some embodiments.

Referring now to FIG. 1B, in some embodiments, the instrument delivery device 10 may include another housing 26, which may be coupled to the distal connector 16. In some embodiments, the other housing 26 may include another distal connector 28, another proximal connector 30, and another lumen 32 extending through the other distal connector 28 and the other proximal connector 30. In some embodiments, the other housing 26 may include a one-way valve 34 disposed within the other lumen 32. In some embodiments, the one-way valve 34 may include a duckbill valve. In some embodiments, the one-way valve 34 may allow fluid to flow in a distal direction through the one-way valve 34 but not a proximal direction.

In some embodiments, the distal connector 16 and/or the other distal connector 28 may include a cannula, a male luer connector, or another suitable connector. In some embodiments, the proximal connector 18 and/or the other proximal connector 30 may include a female luer connector or another suitable connector. In some embodiments, the distal connector 16 may be coupled to the other proximal connector 30. In some embodiments, an outer diameter of the distal end 22 of the vascular access instrument 12 may be less than a diameter of the distal connector 16 such that the vascular access instrument 12 may move distally through the distal connector 16.

In some embodiments, the proximal end 24 of the vascular access instrument 12 may include a stop 36. In some embodiments, an outer diameter 38 of the stop 36 may be greater than a diameter 40 of the lumen 20 to prevent the proximal end 24 of the vascular access instrument 12 from moving through the distal connector 16. In some embodiments, the stop 36 may be spherical, wedge-shaped, semi-spherical, conical, or another suitable shape. In some embodiments, an outer diameter of a proximal portion of the stop 36 may be greater than an outer diameter of a distal portion of the stop 36, which may facilitate fluid flow carrying the instrument in the distal direction. In some embodiments, the stop 36 may be free within the lumen 20. In other embodiments, the stop 36 may be fixed within the lumen 20. For example, the stop 36 may be fixed to an inner surface of the housing 14 forming the lumen 20.

In some embodiments, the housing 14 and the other housing 26 may be separate units and coupled together via compatible connectors. In some embodiments, the instrument delivery device 10 may not include the other housing 26 because the one-way valve 34 may not be needed with a particular procedure or a particular catheter assembly, for example. In some embodiments, the housing 14 and the other housing 26 may be monolithically formed as a single unit.

Figure 2A:
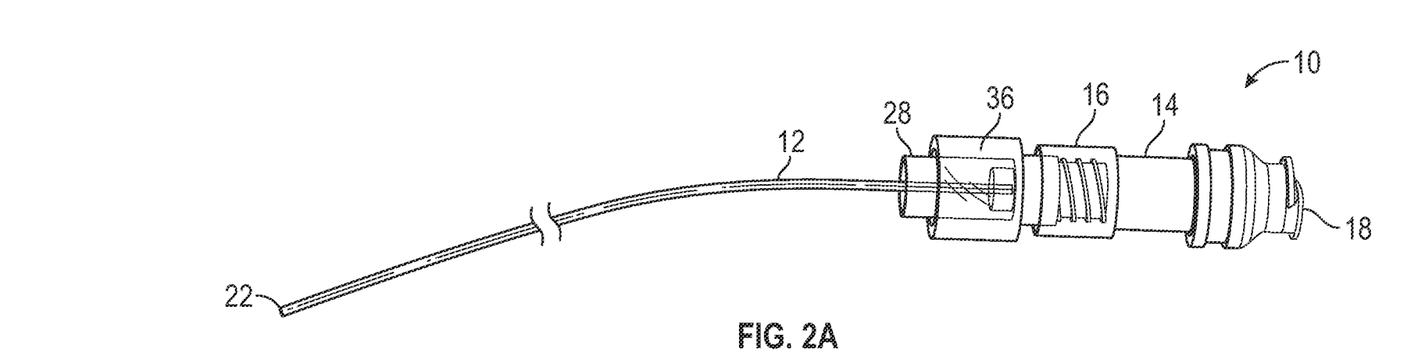
FIG. 2A is an upper perspective view of the instrument delivery device coupled to the other housing, illustrating an example vascular access instrument in an advanced position, according to some embodiments.
Figure 2B:
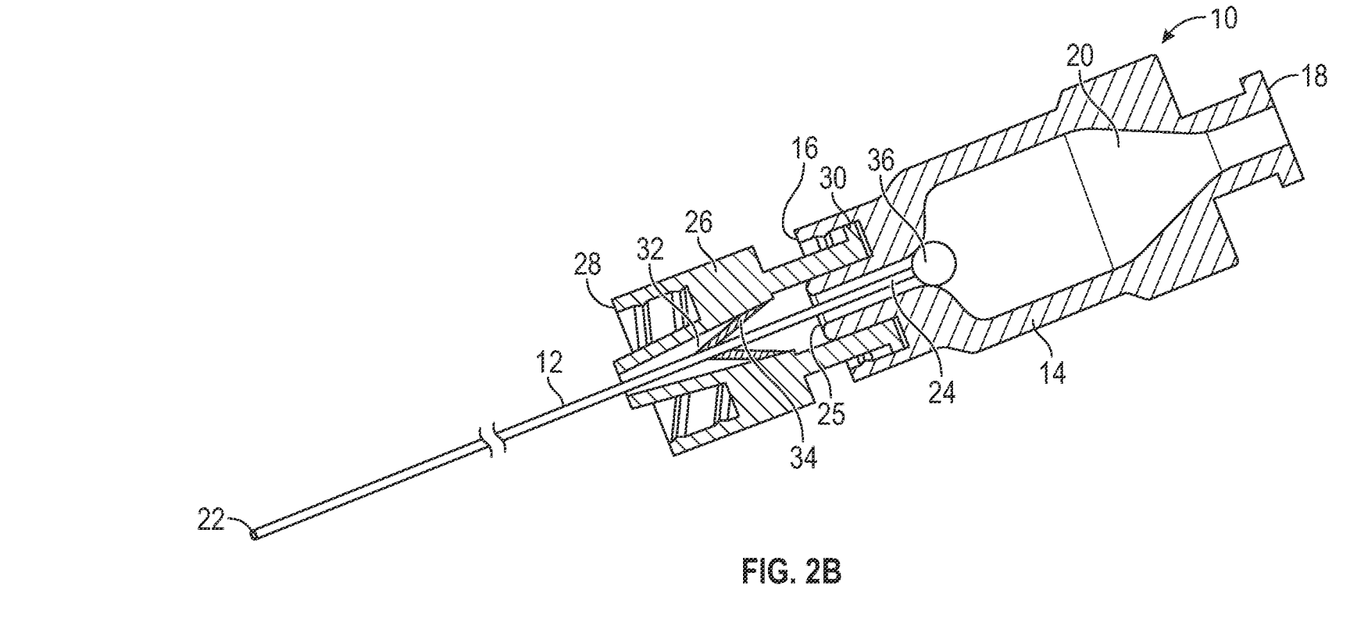
FIG. 2B is a cross-sectional view of the instrument delivery device coupled to the other housing, illustrating the vascular access instrument in the advanced position, according to some embodiments.

Referring now to FIGS. 2A-2B, in some embodiments, the vascular access instrument 12 may be configured to move from the compact position to the outstretched position, which may include an uncoiled position, and advance through the distal connector 16 in the distal direction. In some embodiments, the vascular access instrument 12 in the uncoiled position may be completely uncoiled or less coiled than in the coiled position. In some embodiments, the vascular access instrument 12 may include a tube, as illustrated, for example, in FIGS. 1A-2B. In some embodiments, the tube may include a variable outer diameter and/or a variable inner diameter along a length of the tube. In some embodiments, the tube may include a constant outer diameter and/or a constant inner diameter along the length of the tube.

In some embodiments, the tube may be constructed of a polymeric material and/or an elastomeric material. In some embodiments, the tube may be constructed of a soft material that has a durometer less than that of a standard peripheral intravenous catheter, which may reduce trauma to the vasculature during advancement of the vascular access instrument 12.

In some embodiments, the tube may include one or more durometers and/or materials. In some embodiments, the tube may include or correspond to the tubular instrument further described in U.S. patent application Ser. No. 17/143,095, filed Jan. 6, 2021, entitled "TUBULAR INSTRUMENT AND RELATED DEVICES AND METHODS," which is incorporated by reference in its entirety. In some embodiments, the tube may include single or multiple material extrusion or construction. In some embodiments, the tube may include multiple segments which may be joined via solvent bonding, adhesive bonding, swaging, ultrasound welding, tipping, etc. In some embodiments, the tube may be monolithically formed as a single unit. In some embodiments, the tube may include one or more of a distal opening, a proximal opening, and one or more side holes.

Figures 3A, 3B:
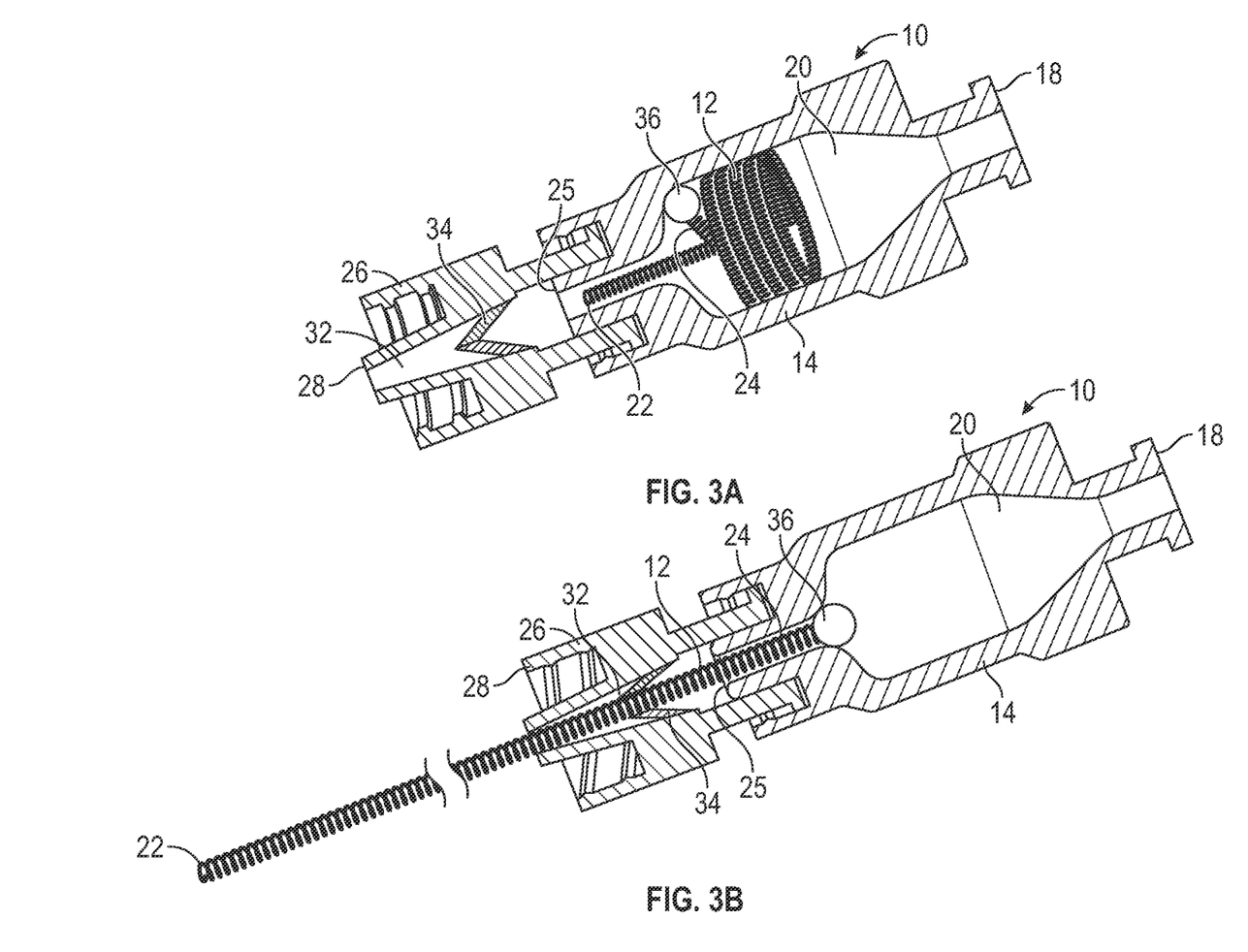
FIG. 3A is a cross-sectional view of the instrument delivery device coupled to the other housing, illustrating another example vascular access instrument in a coiled position, according to some embodiments.
FIG. 3B is a cross-sectional view of the instrument delivery device coupled to the other housing, illustrating the other vascular access instrument in the advanced position, according to some embodiments.

Referring now to FIGS. 3A-3B, in some embodiments, the vascular access instrument 12 may include a wire. In some embodiments, the wire may be coiled in addition to being disposed in the coiled position. In further detail, in some embodiments, the wire may include smaller coils disposed along all or a portion of a length of the wire, and the wire may also be wound into a larger coil when in the coiled position such that an overall shape of the wire is coil-shaped. In some embodiments, at least at a portion of the wire that extends distally beyond the vascular access instrument may include the smaller coils, which may facilitate thrombus prevention. In some embodiments, due to the smaller coils, there may be reduced room for thrombus to enter the vascular access device during insertion of the vascular access device into vasculature of a patient. Also, in some embodiments, the smaller coils may decrease potential for trauma to the vasculature in response to the vascular access instrument 12 being advanced through the vascular access device and into the vasculature. Further, in some embodiments, the smaller coils may facilitate blood flow through the vascular access instrument 12 and into the vascular access device under negative pressure. In some embodiments, the wire may be constructed of metal or another suitable material.

Figure 4A:
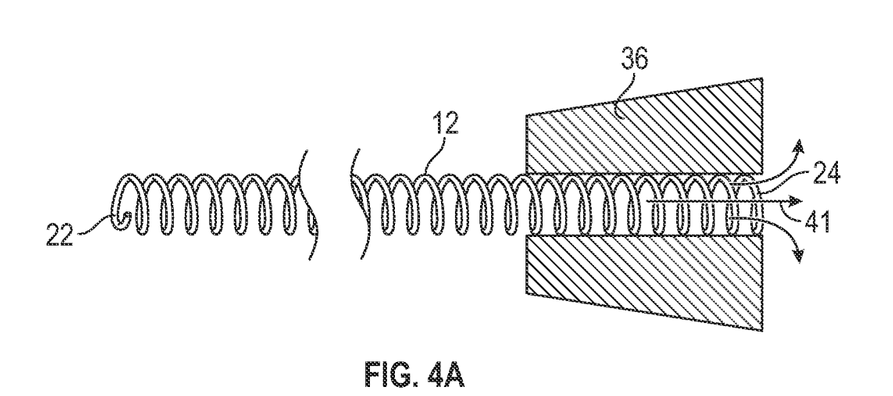
FIG. 4A is a cross-sectional view of an example wedge, according to some embodiments.
Figure 4B:
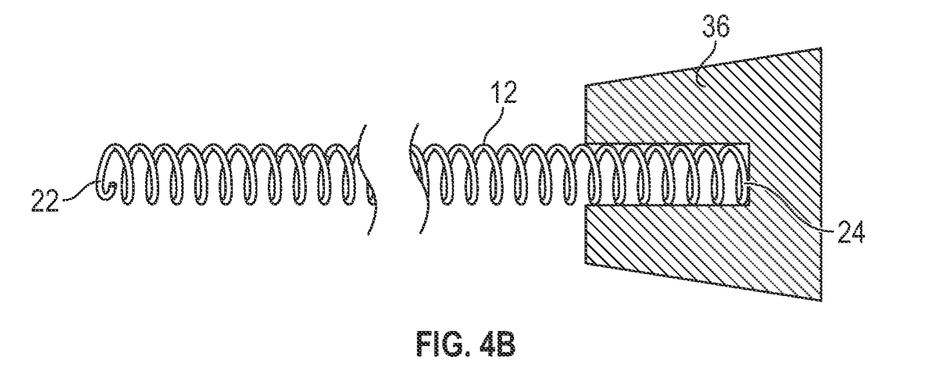
FIG. 4B is a cross-sectional view of another example wedge, according to some embodiments.

Referring now to FIGS. 4A-4B, in some embodiments, the stop 36 may include a fluid pathway 41 extending through the stop 36, as illustrated, for example, in FIG. 4A. In some embodiments, the fluid pathway 41 may be aligned with a central axis of the stop 36. In some embodiments, the stop 36 may be configured to prevent fluid from flowing through the stop 36, as illustrated, for example, in FIG. 4B.

In some embodiments, the proximal end 24 of the vasculature access instrument 12, which may include the wire, the tube, or another suitable vascular access instrument, may be coupled to the stop 36 via an interference fit, press fit, friction fit, material-bonding, or another suitable manner. In some embodiments, the stop 36 may be constructed of one or more of a polymeric material, an elastomeric material, a metallic material, and another suitable material.

Figure 5:
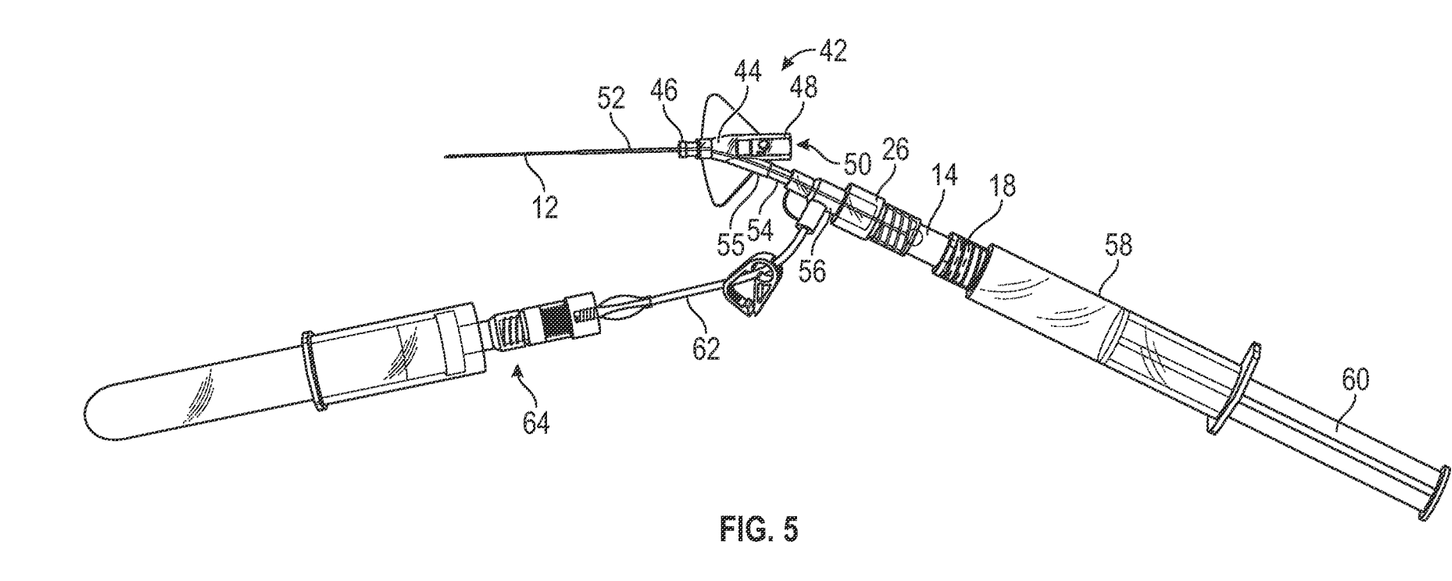
FIG. 5 is an upper perspective view of an example vascular access system, according to some embodiments.

Referring now to FIG. 5, in some embodiments, the vascular access device may include a catheter assembly 42, which may be inserted into the vasculature of the patient. In some embodiments, the catheter assembly 42 may include a catheter adapter 44, which may include a distal end 46, a proximal end 48, and a lumen 50 extending through the distal end 46 and the proximal end 48. In some embodiments, the catheter assembly 42 may include a catheter 52 extending distally from the distal end 46 of the catheter adapter 44. In some embodiments, the catheter 52 may include a peripheral intravenous catheter, a peripherally-inserted central catheter, or a midline catheter.

In some embodiments, the instrument delivery device 10 may be coupled to the catheter assembly 42, which may be dwelling within the vasculature of the patient. In some embodiments, coupling the instrument delivery device 10 to the catheter assembly 42 may include coupling the other distal connector 28 to the catheter assembly 42. In some embodiments, the instrument delivery device 10 may be coupled to the proximal end 48 of the catheter adapter 44.

In some embodiments, the catheter assembly 42 may include an extension tube 54 integrated in a side port 55 of the catheter adapter 44. In some embodiments, a proximal end of the extension tube 54 may be coupled to an adapter 56, such as, for example, a Y-adapter or a T-adapter. In some embodiments, the instrument delivery device 10 may be coupled to the adapter 56. In other embodiments, the other housing 26 and/or the housing 14 may be monolithically formed with the adapter 56 as a single unit.

In some embodiments, after inserting the catheter 52 into the vasculature of the patient, the vascular access instrument 12 may be advanced through the catheter 52, as illustrated in FIG. 5. In some embodiments, advancing the vascular access instrument 12 through the catheter 52 may include coupling a pre-filled syringe 58 to the proximal connector 18 and depressing a plunger 60 of the pre-filled syringe 58. In some embodiments, the pre-filled syringe 58 may be filled with a flushing solution, such as, for example, saline solution, which may be flushed through the catheter 52 in response to depressing the plunger 60. In some embodiments, the housing 14 may be coupled to any suitable pre-filled syringe.

In some embodiments, the vascular access instrument 12 may be unattached to the housing 14, which may facilitate movement of the distal end 22 of the vascular access instrument 12 through the distal connector 16 in response to pressure due to depression of the plunger 60 of the pre-filled syringe 58. In some embodiments, the flushing through the catheter 52 may be referred to as "flush-in-place" because the catheter 52 may be dwelling within the vasculature of the patient when the flushing occurs. In some embodiments, when the vascular access instrument 12 moves from the compact position to the outstretched position to advance the vascular access instrument 12, the distal end 22 of the vascular access instrument 12 may move distally through one or more of the following in a non-tortuous fluid path: the distal connector 16, the other housing 26, the adapter 56, the extension tube 54, the side port 55, the distal end 46 of the catheter adapter 44, and the catheter 52.

In some embodiments, a distal end of another extension tube 62 may be coupled to the adapter 56. In some embodiments, a proximal end of the other extension tube 62 may be coupled to a blood collection device 64, which may include a VACUTAINER® available from Becton Dickinson and Company of Franklin Lakes, New Jersey, or another suitable blood collection device. In some embodiments, blood may be collected using the blood collection device 64 in response to the vascular access instrument 12 being in the outstretched position and distal to the catheter 52.

Figure 6:
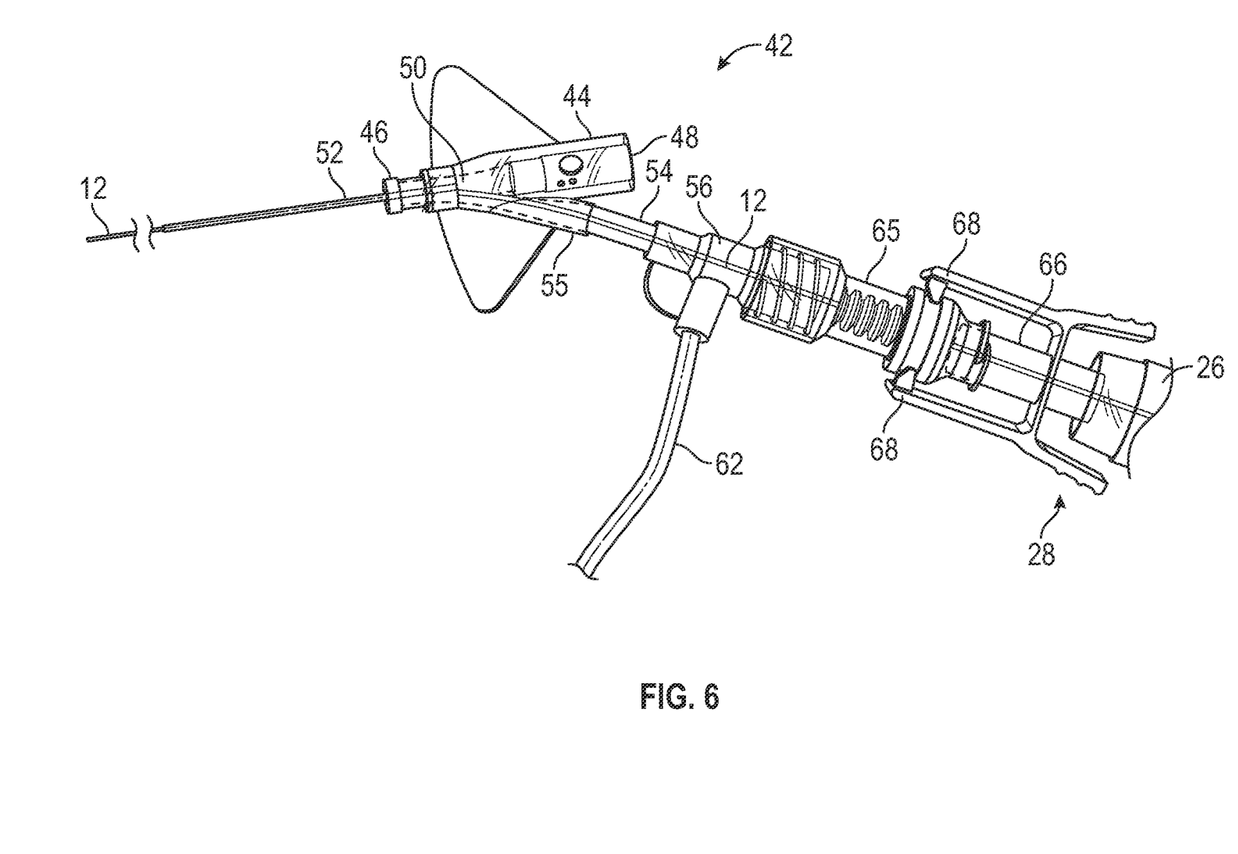
FIG. 6 is an upper perspective view of a portion of the vascular access system, illustrating an example other distal connector, according to some embodiments.
Figure 7A:
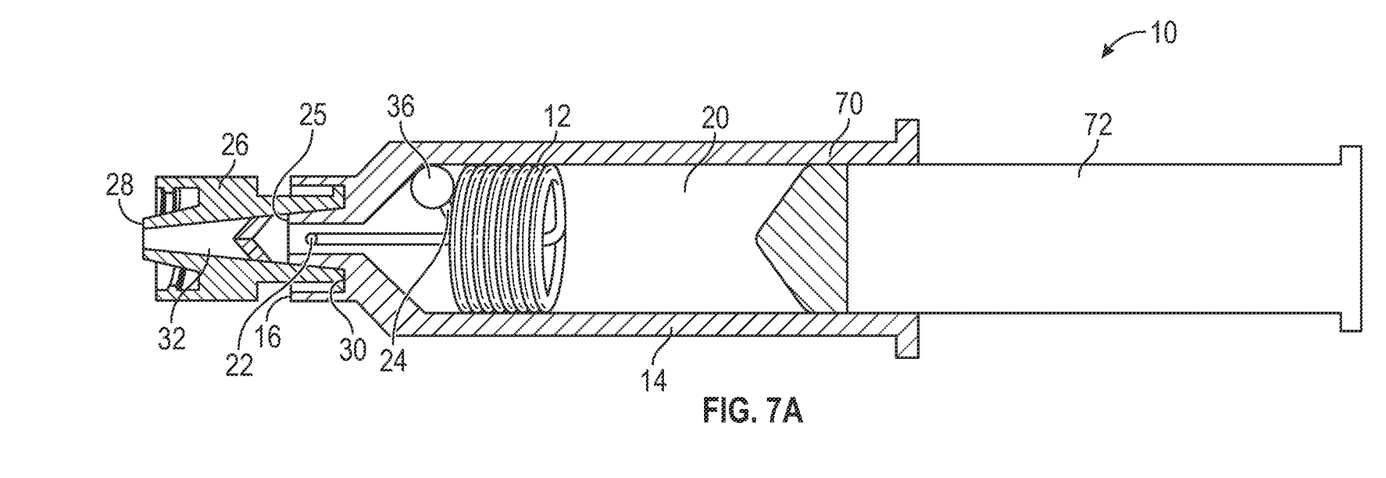
FIG. 7A is a cross-sectional view of another instrument delivery device, illustrating the vascular access instrument in the coiled position, according to some embodiments.
Figure 7B:
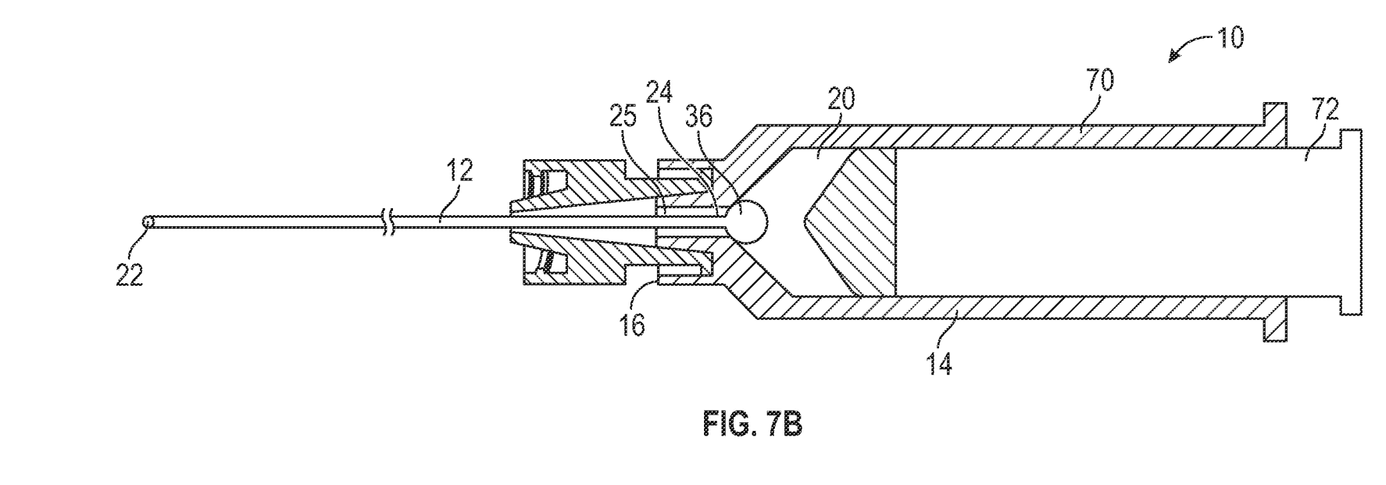
FIG. 7B is a cross-sectional view of the other instrument delivery device, illustrating the vascular access instrument in the advanced position, according to some embodiments.

Referring now to FIG. 6, in some embodiments, the instrument delivery device 10 may be coupled to a needleless access connector 65, which may be coupled to the adapter 56 or another portion of the catheter assembly 42. In some embodiments, the needleless access connector 65 may include a non-torturous or generally straight path to facilitate passage of the vascular access instrument 12 through the needleless access connector 65. In some embodiments, the other distal connector 28 may include a cannula 66, which may insert within the adapter 56, the needleless access connector 65, or the catheter adapter 44. In some embodiments, the cannula 66 may be blunt. In some embodiments, the distal connector 16 may include one or more arms 68, which may be biased inwardly to interfere with an outer surface of adapter 56, the needleless access connector 65, or another portion of the catheter assembly 42. In some embodiments, the distal connector 16 may include the cannula 66 and/or the arms 68. As mentioned, in some embodiments, the distal connector 16 may include a male luer connector or another suitable connector Referring now to FIGS. 7A-7B, in some embodiments, the housing 14 may include a pre-filled syringe 70, which may include the distal connector 16. In some embodiments, the vascular access instrument 12 may be disposed within the pre-filled syringe 70. In some embodiments, in response to depression of a plunger 72 of the pre-filled syringe 70, the vascular access instrument 12 may be configured to move from the compact position to the outstretched position and advance through the distal connector 16. In some embodiments, the pre-filled syringe 70 may be filled with a flushing solution, such as, for example, saline solution, which may be flushed through the catheter 52 in response to depressing the plunger 72.

All examples and conditional language recited herein are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

The invention claimed is:

1. An instrument delivery device to couple to a vascular access device, the instrument delivery device comprising:
   a single, monolithically formed housing, comprising:
      a distal connector comprising a male luer connector, the male luer connector including an outer collar encircling a central protrusion, with the central protrusion defining a distal opening at a distal end thereof;
      a proximal connector comprising a female luer connector; and
      a lumen formed within the housing and extending through the distal connector and the proximal connector; and
   a vascular access instrument, comprising a distal end and a proximal end, wherein the vascular access instrument is disposed within the lumen of the housing in a compact position, with the distal end of the vascular access instrument positioned within the central protrusion of the male luer connector and adjacent the distal opening when in the compact position, and wherein the vascular access instrument is configured to move from the compact position to an outstretched position and advance through the distal connector;
   wherein the proximal end of the vascular access instrument comprises a stop that prevents the proximal end of the vascular access instrument from moving through the distal connector, the stop comprising a solid member that prevents fluid from flowing therethrough.

2. The instrument delivery device of claim 1, wherein the stop plugs the lumen at a location adjacent the distal connector, to prevent fluid from flowing through the distal connector.

3. The instrument delivery device of claim 2, wherein with the vascular access instrument in the outstretched position, the stop engages a proximal end of a channel extending through the central protrusion, to prevent fluid from flowing through the distal connector.

4. The instrument delivery device of claim 1, wherein the vascular access instrument is configured to move from the compact position to the outstretched position and extend in a distal direction responsive to a fluid flow through the housing in the distal direction, with the fluid flow carrying the vascular access instrument in the distal direction.

\* \* \* \* \*